US012768762B2

(12) United States Patent
Yamaguchi

(10) Patent No.: US 12,768,762 B2
(45) Date of Patent: Oct. 20, 2026

(54) PARTICLE SIZE DISTRIBUTION MEASUREMENT DEVICE, PARTICLE SIZE DISTRIBUTION MEASUREMENT METHOD, AND PROGRAM FOR PARTICLE SIZE DISTRIBUTION MEASUREMENT DEVICE

(71) Applicant: HORIBA, LTD., Kyoto (JP)

(72) Inventor: Tetsuji Yamaguchi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 180 days.

(21) Appl. No.: 18/257,390

(22) PCT Filed: Nov. 24, 2021

(86) PCT No.: PCT/JP2021/042905
§ 371 (c)(1),
(2) Date: Jun. 14, 2023

(87) PCT Pub. No.: WO2022/130916
PCT Pub. Date: Jun. 23, 2022

(65) Prior Publication Data

US 2024/0310264 A1 Sep. 19, 2024

(30) Foreign Application Priority Data

Dec. 17, 2020 (JP) ................................ 2020-209199

(51) Int. Cl.
*G01N 15/0205* (2024.01)
*G01N 15/04* (2006.01)

(52) U.S. Cl.
CPC ....... *G01N 15/0211* (2013.01); *G01N 15/042* (2013.01); *G01N 2015/045* (2013.01)

(58) Field of Classification Search
CPC ............. G01N 15/0211; G01N 15/042; G01N 2015/045; G01N 2015/047; G01N 15/0205
See application file for complete search history.

(56) References Cited

U.S. PATENT DOCUMENTS

2004/0016686 A1 1/2004 Wyatt
2011/0181869 A1* 7/2011 Yamaguchi ........ G01N 15/0205 356/335

(Continued)

FOREIGN PATENT DOCUMENTS

JP 02-031133 A 2/1990
JP 2006-047064 A 2/2006

(Continued)

OTHER PUBLICATIONS

Extended European Search Report dated Oct. 16, 2024, issued for the corresponding EP Patent Application No. 21906279.1.

(Continued)

*Primary Examiner* — Georgia Y Epps
*Assistant Examiner* — Mai Thi Ngoc Tran
(74) *Attorney, Agent, or Firm* — LUCAS & MERCANTI, LLP

(57) ABSTRACT

A centrifugal sedimentation-type particle size distribution measurement device that measures the particle size distribution in a measurement sample by rotating a measurement cell that contains the measurement sample and causing particles in the measurement sample to sediment, said particle size distribution measurement device comprising: a light source that irradiates the measurement cell with light; a scattered light detector that detects the intensity of scattered light caused by the particles in the measurement cell; and a particle size distribution calculation unit that measures the particle size distribution in the measurement sample on the basis of the change over time in the scattered light intensity, said change being caused by the particle sedimentation.

10 Claims, 11 Drawing Sheets

(56) References Cited

U.S. PATENT DOCUMENTS

| | | | | |
|---|---|---|---|---|
| 2014/0339446 | A1 | 11/2014 | Yamamoto et al. | |
| 2016/0376640 | A1* | 12/2016 | Ross | C12Q 1/6818 436/501 |
| 2019/0346354 | A1* | 11/2019 | Yamaguchi | G01N 15/0211 |
| 2020/0025665 | A1* | 1/2020 | Trainer | G01N 21/53 |
| 2020/0033245 | A1* | 1/2020 | Corbett | G01N 15/0211 |

FOREIGN PATENT DOCUMENTS

| | | | |
|---|---|---|---|
| JP | 2016-524703 | A | 8/2016 |
| JP | 2018-535429 | A | 11/2018 |
| WO | 2014/186461 | A1 | 11/2014 |
| WO | 2017/051149 | A1 | 3/2017 |
| WO | 2018/092573 | A1 | 5/2018 |

OTHER PUBLICATIONS

International Search Report for the corresponding patent application No. PCT/JP2021/042905 dated Dec. 28, 2021, with English translation.

Office Action ("Communication") dated Apr. 23, 2026, which was issued for the corresponding Japanese patent application No. 2022-569813, 5 pages, with English translation.

* cited by examiner

PARTICLE SIZE DISTRIBUTION MEASUREMENT DEVICE, PARTICLE SIZE DISTRIBUTION MEASUREMENT METHOD, AND PROGRAM FOR PARTICLE SIZE DISTRIBUTION MEASUREMENT DEVICE

CROSS REFERENCE TO RELATED APPLICATION

This Application is a 371 of PCT/JP2021/042905 filed on Nov. 24, 2021, which, in turn, claims priority of Japanese Patent Application No. 2020-209199 filed on Dec. 17, 2020, and the above applications are incorporated herein by reference.

FIELD

This invention relates to a particle size distribution measurement device, a particle size distribution measurement method, and a program for a particle size distribution measurement device.

BACKGROUND

Some of conventional particle size distribution measurement devices use a centrifugal sedimentation method, in which a measurement cell containing a group of particles dispersed in a dispersion medium is rotated to sediment the particles, and the particle size distribution is measured based on the time variation of transmitted light intensity (or absorbance) obtained by emitting light to the measurement cell (Patent Literature 1). Although this measurement by the centrifugal sedimentation method has the advantage of being able to measure particle size distribution over a relatively wide particle size range, it has the disadvantage of not being able to measure particle size distribution for particles that do not have an absorption band for the light from the light source installed in the device or for particles with a small particle size and low light absorption.

CITATION LIST

Patent Literature

Patent Literature 1: WO2018/092573

SUMMARY

Technical Problem

The present invention was made in view of the above-mentioned problem, and its main object is to provide a centrifugal sedimentation type particle size distribution measurement device that can perform particle size distribution measurement for particles with low absorbance.

Solution to Problem

In solving the above problem, the inventor noticed that particles with a small particle size and low absorbance, for example, tend to scatter light easily. As a result, the inventor found that by emitting light to particles being centrifugally sedimented and detecting the intensity of scattered light and measuring the time variation of the intensity, the sedimentation time of the particles can be determined, which in turn enables measurement of the particle size distribution, leading to this invention.

In other words, the particle size distribution measurement device according to the present invention is a centrifugal sedimentation type particle size distribution measurement device that measures particle size distribution in a measurement sample by rotating a measurement cell containing the measurement sample and sedimenting particles in the measurement sample, the device including: a light source that emits light to the measurement cell; a scattered light detector that detects scattered light intensity of light scattered by the particles in the measurement cell; and a particle size distribution calculation unit that measures particle size distribution in the measurement sample based on the time variation of the scattered light intensity caused by sedimentation of the particles.

With this configuration, since the particle size distribution is measured using scattered light information, it is possible to measure the particle size distribution for particles that do not have an absorption band for the light of the light source mounted on the device, or for particles with a small particle size and low light absorption.

A specific aspect of the scattered light detector is one that includes at least one of a forward light detector that detects forward scattered light and a backward light detector that detects backward scattered light from the particles.

With this configuration, scattered light from particles can be efficiently detected.

It is preferable that the particle size distribution measurement device further includes a transmitted light detector that detects transmitted light intensity of light transmitted through the measurement cell, in which the particle size distribution calculation unit further measures the particle size distribution in the measurement sample based on the time variation of the transmitted light intensity.

With this configuration, the particle size distribution measurement based on the time variation of scattered light intensity and the particle size distribution measurement based on the time variation of transmitted light intensity can be performed, so that the particle size distribution can be measured more accurately by using either of the measurements according to the absorbance of the sedimenting particles.

It is also preferable that the particle size distribution calculation unit measures particle size distribution of a particle size larger than a predetermined threshold based on the time variation of the transmitted light intensity, and measures particle size distribution of a particle size equal to or smaller than the predetermined threshold based on the time variation of the scattered light intensity.

With this configuration, the particle size distribution of particles with a large particle size and high absorbance can be calculated using transmitted light intensity, and the particle size distribution of particles with a small particle size and low absorbance can be calculated using scattered light intensity to accurately measure a wide range of particle size distributions.

In this case, it is preferable that the particle size distribution calculation unit measures the particle size distribution in the measurement sample based on the time variation of the transmitted light intensity and then measure the particle size distribution in the measurement sample based on the time variation of the scattered light intensity.

With this configuration, for example, the particle size distribution measurement based on the time variation of transmitted light intensity is performed while particles with a large particle size and high absorbance are sedimenting, and then the particle size distribution measurement based on the time variation of scattered light intensity is performed while only particles with a small particle size and low absorbance are sedimenting, so that particle size distribution can be efficiently measured.

As a specific aspect of the particle size distribution measurement device, it is preferable that the light source includes a semiconductor laser device and an LED device, the scattered light detector is configured to detect the scattered light of laser light emitted from the semiconductor laser device and scattered by the particles, and the transmitted light detector is configured to detect the transmitted light emitted from the LED device and transmitted through the measurement cell.

With this configuration, by using an appropriate light source for each detector, the time variation of scattered light intensity and the time variation of transmitted light intensity can be measured more accurately and the particle size distribution can be measured more accurately.

Another specific aspect of the particle size distribution measurement device is that the scattered light detector and the transmitted light detector are preferably configured to detect light emitted from a common light source to the measurement cell.

With this configuration, measurement of the time variation of scattered light intensity and measurement of the time variation of transmitted light intensity are performed using a common light source, and thus manufacturing costs can be reduced.

The particle size distribution measurement method of the present invention is a method, using a centrifugal sedimentation method, that measures particle size distribution in a measurement sample by rotating a measurement cell containing the measurement sample and sedimenting particles in the measurement sample, the method including: a step of emitting light to the particles; a scattered light detecting step of detecting scattered light intensity of light scattered by the particles; and a particle size distribution calculation step of measuring particle size distribution in the measurement sample based on time variation of the scattered light intensity caused by sedimentation of the particles.

The program for a particle size distribution measurement device of the present invention is a program for a centrifugal sedimentation type particle size distribution measurement device that measures particle size distribution in a measurement sample by rotating a measurement cell containing the measurement sample and sedimenting particles in the measurement sample, the device including: a light source that emits light to the measurement cell; and a scattered light detector that detects scattered light intensity of light scattered by the irradiation of light to the particles, the program causing a computer to perform a function as a particle size distribution calculation unit that measures particle size distribution in the measurement sample based on time variation of the scattered light intensity caused by sedimentation of the particles.

With such a particle size distribution measurement method and a program for a particle size distribution measurement device, the same effects as the above-mentioned particle size distribution measurement device of the present invention can be achieved.

Advantageous Effects of Invention

According to the present invention thus configured, a centrifugal sedimentation type particle size distribution measurement device that can perform particle size distribution measurement for particles with low absorbance can be provided.

REFERENCE SIGNS LIST

100 Particle size distribution measurement device
22 Second light source
32 Scattered light detector
42 Particle size distribution calculation unit
X Measurement cell

DESCRIPTION OF EMBODIMENTS

A particle size distribution measurement device 100 according to the present invention will be described below with reference to the drawings.

The particle size distribution measurement device 100 in the present embodiment measures the particle size distribution of a group of particles in a measurement sample, such as pharmaceuticals, foods, chemical industry products, and bubble particles, using a centrifugal sedimentation method. More specifically, this particle size distribution measurement device 100 uses a homogeneous sedimentation method, in which particles are centrifugally sedimented by rotating a measurement cell X, which contains a group of particles in a dispersion medium.

First, the general principle of measuring particle size distribution by a centrifugal sedimentation method is explained.

For example, when a group of particles is suspended in a dispersion medium such as water, the particles gradually sink. The larger the particle size (particle diameter), the faster this sedimenting speed is. If the materials of the particles and dispersion medium are known, a particle size can be calculated by measuring the time it takes the particle to sediment a certain distance.

Figure 2:
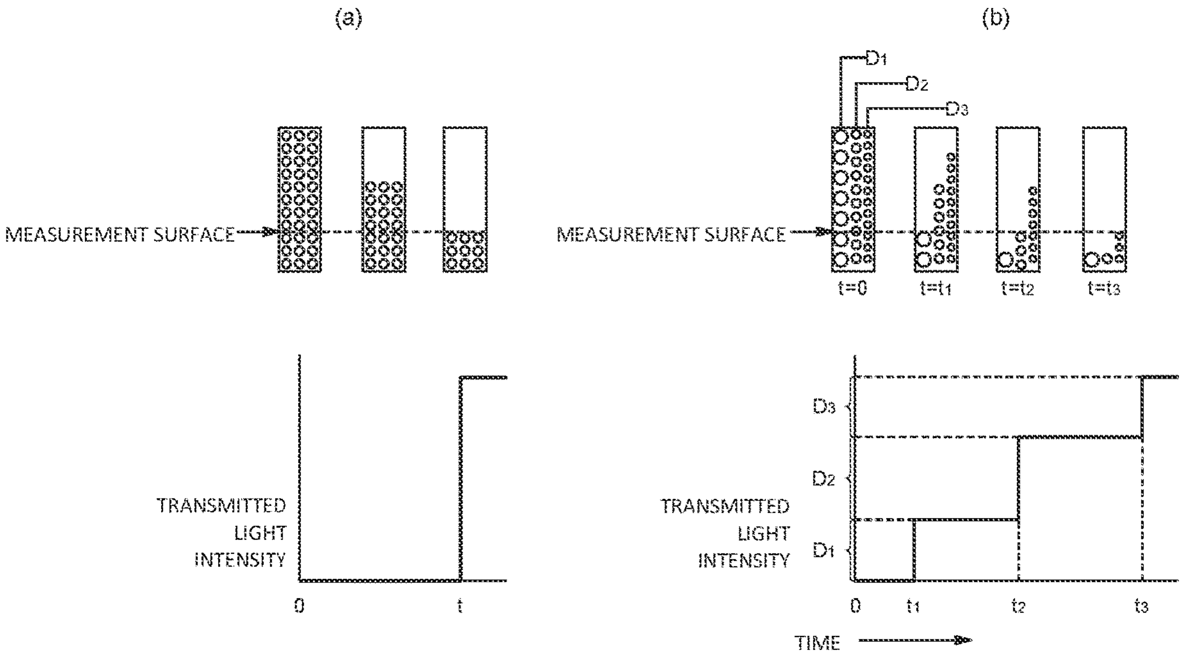
FIG. 2 is a diagram for explaining the principle of measuring particle size distribution based on the time variation of transmitted light intensity by the particle size distribution measurement device in the embodiment.

Specifically, light is emitted to a measurement surface of the measurement cell X to detect transmitted light, and the time variation of transmitted light intensity and absorbance calculated from the transmitted light intensity are measured. As illustrated in FIG. 2(*a*), if a group of dispersed particles are all the same size, these particles sediment at the same sedimentation rate, and the transmitted light intensity increases rapidly after a certain time from the start of sedimentation. In practice, particles of various sizes are mixed together, and in this case, as illustrated in FIG. 2(*b*), it appears as a composite of changes in transmitted light intensity of light transmitted through particles with different sedimenting times. In this principle, smaller particles have a slower sedimentation rate and take longer to measure. In the centrifugal sedimentation method, particles are therefore not sedimented by natural gravity, but by centrifugal force to shorten the sedimentation time.

Figure 1:
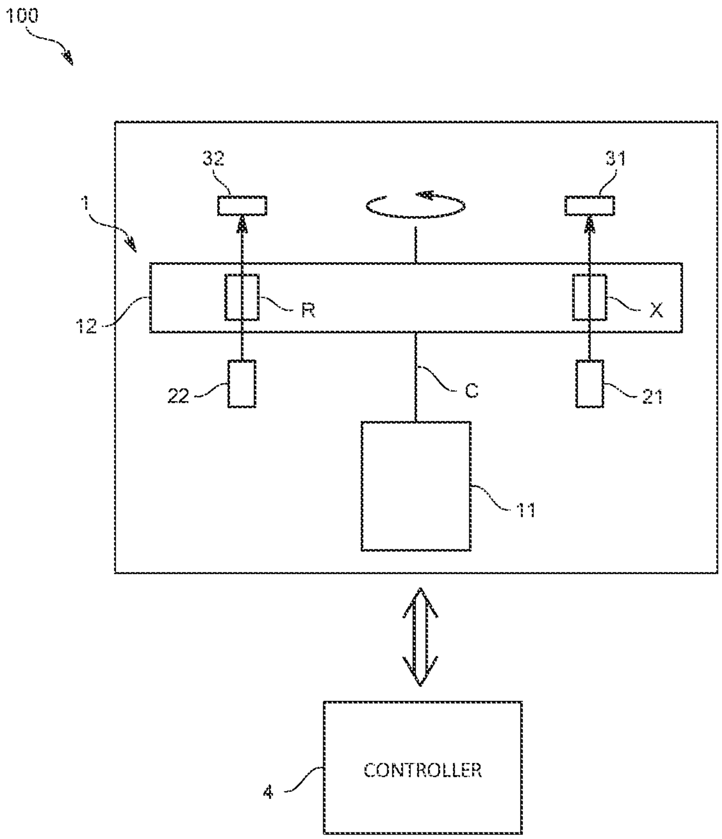
FIG. 1 is a schematic diagram illustrating a configuration of a particle size distribution measurement device in one embodiment of the present invention.
Figure 3:
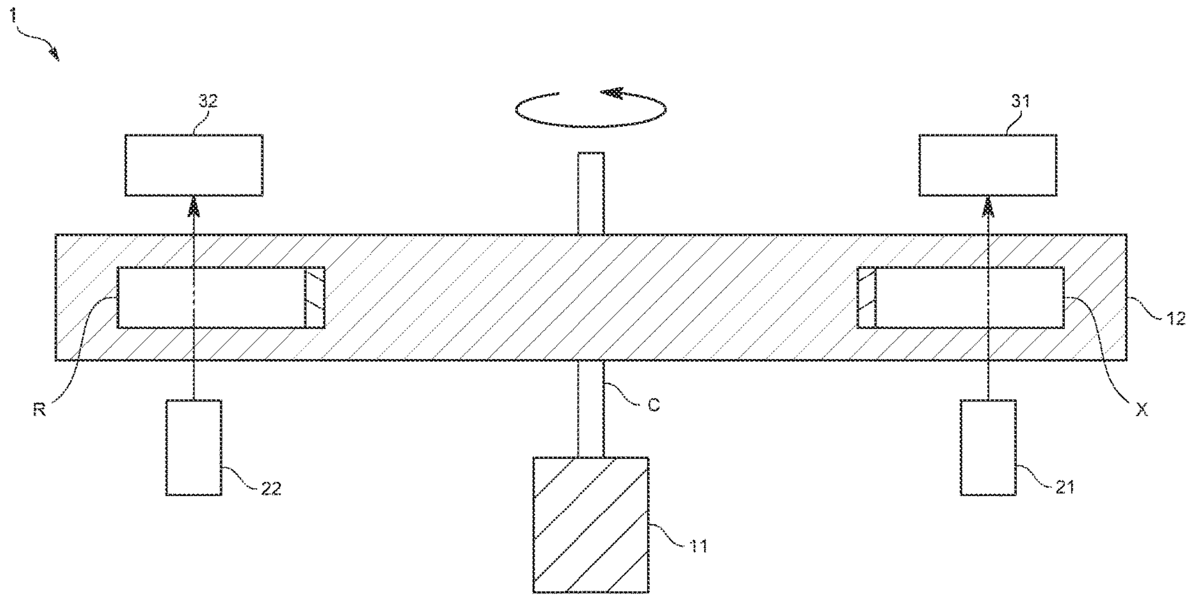
FIG. 3 is a diagram for explaining a light source, a transmitted light detector, and a scattered light detector in the embodiment.

Specifically, as illustrated in FIGS. 1 and 3, this particle size distribution measurement device 100 includes a rotation mechanism 1 that rotates the measurement cell X, a first light source 21 that emits light to the measurement cell X, a transmitted light detector 31 that detects transmitted light from the first light source 21 that has transmitted through the measurement cell X, and a controller 4.

The rotation mechanism 1 includes a motor 11 and a rotating disk 12 fixed to an output shaft of the motor 11, so that the rotating disk 12 rotates with the output shaft of the motor 11 as a rotation axis C and its faceplate portion horizontal. The rotating disk 12 includes a measurement cell holder in which the measurement cell X is set and a reference cell holder in which a reference cell R is set, and the reference cell R contains the same dispersion medium (in this case water) as that contained in the measurement cell X.

The first light source 21 emits light that does not include infrared light in order to prevent the temperature of the dispersion medium from rising, and in this case, LED devices such as blue and green LEDs are used.

The transmitted light detector 31 is provided on the opposite side of the first light source 21 with respect to the rotating disk 12, detects transmitted light emitted from the first light source 21 and transmitted through the measurement cell X and the reference cell R, and transmits a transmitted light intensity signal indicating the transmitted light intensity to the controller 4. The transmitted light detector 31 here is a line sensor, but it may be a single light sensor (e.g., photodiode).

In the present embodiment, the transmitted light from the measurement cell X and the transmitted light from the reference cell R are detected by the common transmitted light detector 31. Thus, an LED for synchronous signal generation and a detector that detects light from this LED for synchronous signal generation, which are not illustrated in the drawings, are provided so that the transmitted light intensity signal detected by the transmitted light detector 31 can be distinguished as to which cell the transmitted light is from.

Figure 4:
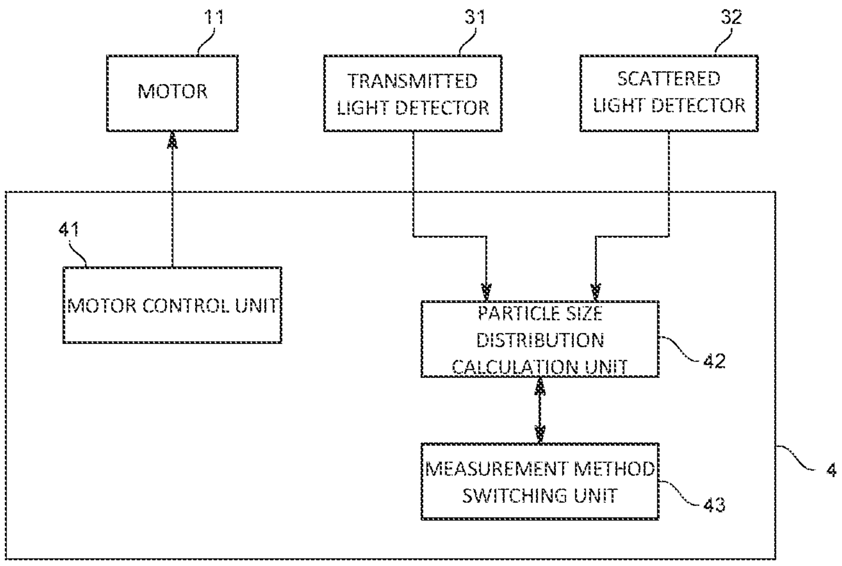
FIG. 4 is a functional block diagram illustrating functions of the particle size distribution measurement device in the embodiment.

The controller 4 is a general-purpose or dedicated computer including a CPU, a memory, an input/output interface, and the like. This controller 4, by having the CPU and peripherals work together in accordance with a specified program stored in a specified area of the memory, performs at least the functions of a motor control unit 41 and a particle size distribution calculation unit 42, as illustrated in FIG. 4. These functions may be provided by one or more separate computers.

The motor control unit 41 controls the rotation speed of the motor 11 so that the rotating disk 12 rotates at a predetermined target rotation speed. Specifically, this motor control unit 41 obtains a position detection signal from a position detector such as an encoder, not illustrated in the drawings, that detects the position of the rotating disk 12, calculates the rotation speed of the rotating disk 12, and feed-back controls the motor 11 so that its rotation speed becomes the preset target rotation speed. The target rotation speed may be set to a constant rotation speed or may be set to increase with time. In other words, the motor control unit 41 may rotate the rotating disk 12 at a constant speed or at an accelerated speed.

The particle size distribution calculation unit 42 calculates the particle size distribution (hereinafter also referred to as first particle size distribution) based on the time variation of a transmitted light intensity signal detected by the transmitted light detector 31. The particle size distribution calculation unit 42 may be configured to calculate the first particle size distribution based on the time variation of absorbance calculated using a transmitted light intensity signal.

Specifically, this particle size distribution calculation unit 42 calculates absorbance A(t) for the measurement cell X based on reference transmitted light intensity Ia of the transmitted light transmitted through the reference cell R and measured transmitted light intensity Ib of the transmitted light transmitted through the measurement cell X obtained each time the rotating disk 12 makes one rotation, and calculates the first particle size distribution based on the time variation of the absorbance A(t). The absorbance A(t) indicates an absorbance curve, which is the time variation of absorbance caused by the sedimentation of particles, and is calculated by the formula $A(t)=-\log(Ia/Ib)$, for example. In calculating the absorbance A(t), the particle size distribution calculation unit 42 may acquire and use the reference transmitted light intensity Ia only once at the beginning, or it may acquire and use the reference transmitted light intensity Ia for each rotation of the rotating disk 12.

The particle size distribution measurement device 100 of the present embodiment further includes a second light source 22 that emits light to the measurement cell X and a scattered light detector 32 that detects scattered light generated when light from the second light source 22 is scattered by particles in the measurement cell X, as illustrated in FIGS. 1 and 3, to enable particle size distribution measurement for particles having low absorbance. The particle size distribution calculation unit 42 is further configured to acquire the scattered light intensity signal detected by the scattered light detector 32 and calculate particle size distribution (hereinafter referred to as second particle size distribution) based on the time variation of this scattered light intensity signal.

The second light source 22 is a semiconductor laser, for example, that emits a laser beam, and is arranged so that the second light source 22 can emit light onto a rotational path of the measurement cell X.

The scattered light detector 32 detects scattered light scattered by the particles in the measurement cell X and transmits a scattered light intensity signal indicating the intensity of the scattered light to the controller 4. Specifically, the scattered light detector 32 is a photomultiplier tube (PMT), an avalanche photodiode (APD), or the like. Since detectors such as PMTs and APDs are susceptible to temperature effects, a Peltier element or other temperature control device may be provided when such a detector is used as the scattered light detector 32. The scattered light detector 32 may be a forward light detector that detects forward scattered light or a backward light detector that detects backward scattered light from a sample. Here, the scattered light detector 32 is located on the opposite side of the second light source 22 with respect to the rotating disk 12. The position of the scattered light detector 32 may be changed as needed, for example, to the same side of the rotating disk 12 as the second light source 22, as long as it is at a position where scattered light from the particles in the measurement cell X can be detected.

Figure 5:
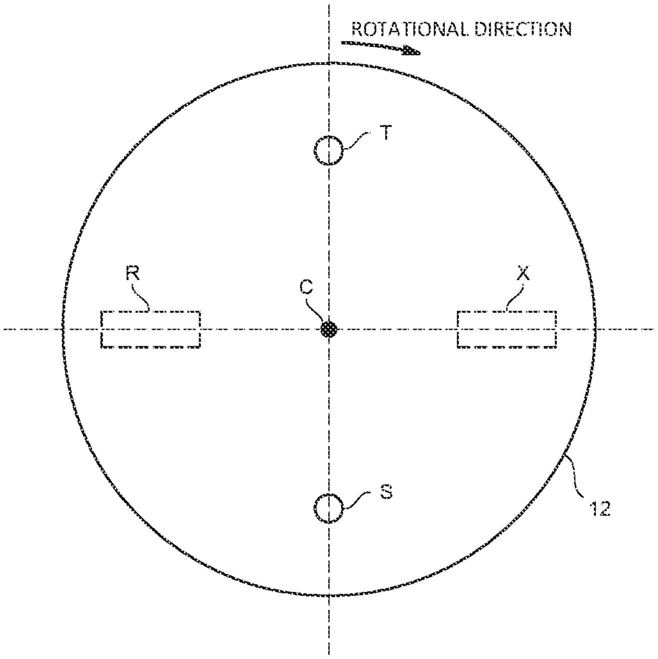
FIG. 5 is a plan view schematically illustrating an arrangement pattern of each cell and each optical system in the embodiment.

As illustrated here in FIG. 5, the rotating disk 12 is configured so that the measurement cell X and the reference cell R are positioned 180° apart from each other along the rotational direction, as viewed from the direction along the rotation axis C. A transmission optical system T, including the first light source 21 and the transmitted light detector 31, and a scattering optical system S, including the second light source 22 and the transmitted light detector 33, are positioned 180° apart from each other along the rotational direction. In FIG. 5, the positions of the transmission optical system T and the scattering optical system S represent the positions of the principal ray axes of the light emitted from the light sources 21 and 22.

The particle size distribution calculation unit 42 calculates the second particle size distribution based on the time variation of a scattered light intensity signal detected by the scattered light detector 32, which is caused by particle sedimentation.

The principle of measuring the second particle size distribution by a centrifugal sedimentation method using scattered light intensity in the present embodiment is explained here.

The principle of measuring the second particle size distribution using scattered light intensity is basically the same as the principle of measuring the first particle size distribution using transmitted light intensity, and a particle size is calculated by measuring the time taken for the particle to sediment a certain distance in a dispersion medium such as water.

Figure 6:
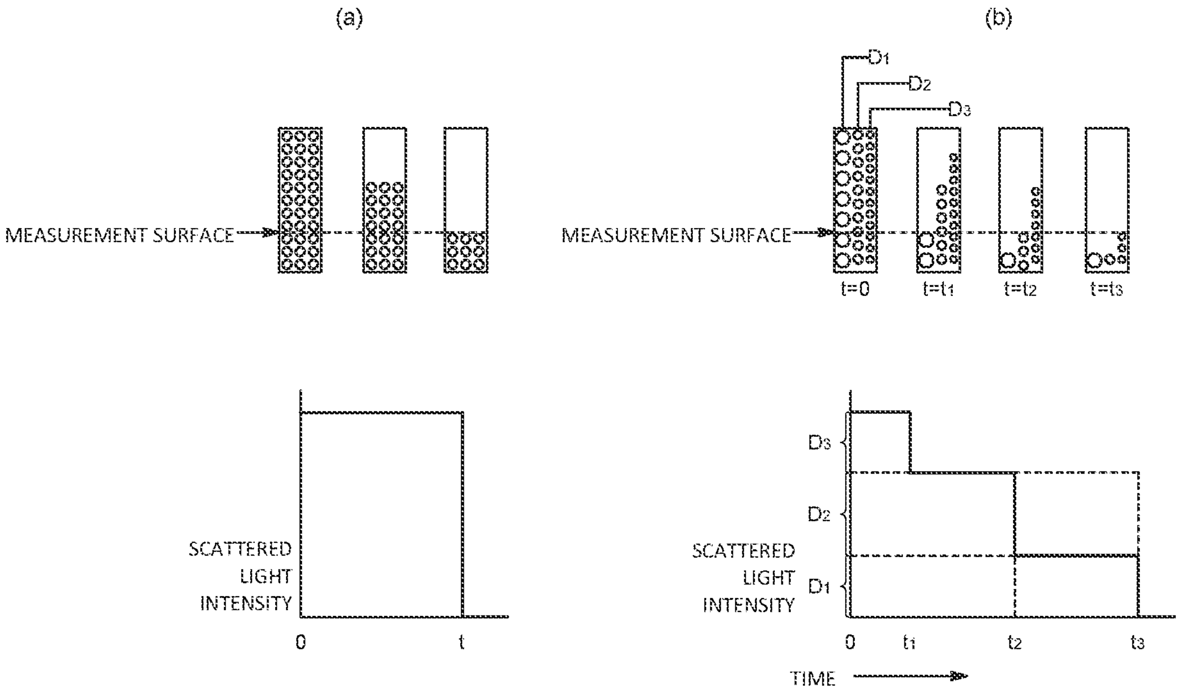
FIG. 6 is a diagram for explaining the principle of measuring particle size distribution based on the time variation of scattered light intensity by the particle size distribution measurement device in the embodiment.

Specifically, light is emitted to the measurement surface of the measurement cell X to detect light scattered by particles, and the time variation of the scattered light intensity caused by the sedimenting of the particles is measured. As illustrated in FIG. 6(*a*), if a group of dispersed particles are all the same size, these particles sediment at the same sedimentation rate, and the scattered light intensity drops rapidly after a certain time from the start of sedimentation. In practice, particles of various sizes are mixed together, and in this case, as illustrated in FIG. 6(*b*), it appears as a composite of changes in the intensity of light scattered by particles with different sedimenting times.

Specifically, this particle size distribution calculation unit 42 calculates scattered light intensity B (t) based on background light intensity Id detected by the scattered light detector 32 when the light from the second light source 22 is emitted to the reference cell R, and measured scattered light intensity Ie of light scattered by the particles in the measurement cell X for each rotation of the rotating disk 12, and then calculates the second particle size distribution based on the time variation of this scattered light intensity B(t). The scattered light intensity B(t) indicates a scattered light intensity curve, which is the time variation of the scattered light intensity caused by the sedimentation of particles, and is calculated, for example, by the formula $B(t)=-\log(Id/Ie)$. In calculating the scattered light intensity B(t), the particle size distribution calculation unit 42 may acquire and use the background light intensity Id only once at the beginning, or it may acquire and use the background light intensity Id for each rotation of the rotating disk 12. In the present embodiment, the scattered light from the measurement cell X and the scattered light from the reference cell R are detected by the common scattered light detector 32. Thus, an LED for synchronous signal generation and a detector that detects light from this LED for synchronous signal ssssgeneration, which are not illustrated in the drawings, are provided so that the scattered light intensity signal detected by the scattered light detector 32 can be distinguished as to which cell the scattered light is from.

The controller 4 of the present embodiment is configured to measure the first particle size distribution based on transmitted light intensity and then measure the second particle size distribution based on scattered light intensity. Specifically, this controller 4 further functions as a measurement method switching unit 43, as illustrated in FIG. 4.

Figure 7:
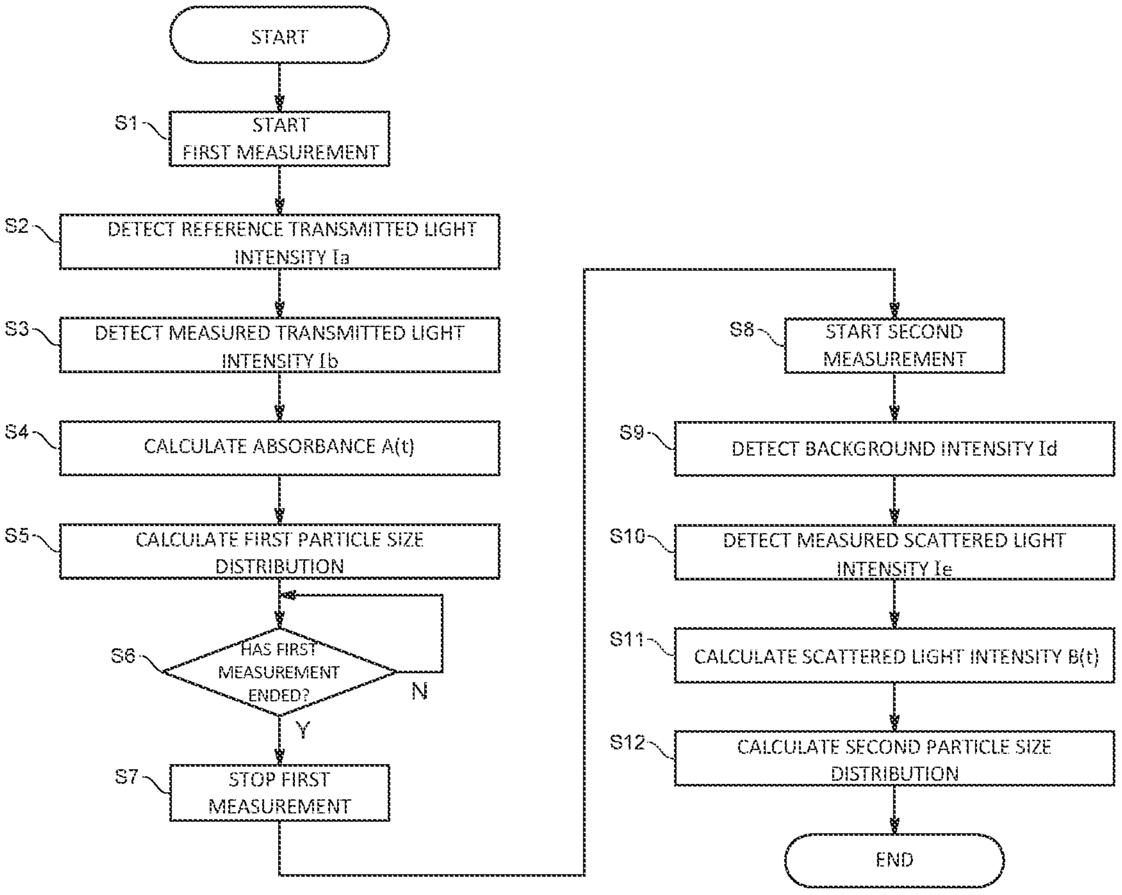
FIG. 7 is a flowchart illustrating an operation of the particle size distribution measurement device in the embodiment.

An operation of the particle size distribution measurement device 100 of the present embodiment is described below, referring to the flowchart illustrated in FIG. 7, which also serves as an explanation of each part. Here, the particle size distribution measurement device 100 first measures the first particle size distribution (hereinafter referred to as first measurement), and then measures the second particle size distribution (hereinafter referred to as second measurement).

First, for example, when a user inputs a measurement start signal using an input unit, the particle size distribution measurement device 100 starts the first measurement (S1). Specifically, the motor control unit 41 outputs a control signal to the motor 11 to rotate the rotating disk 12, and causes light from the first light source 21 to be emitted to the measurement cell X, and causes the particle size distribution calculation unit 42 to calculate the first particle size distribution.

To describe the calculation of the first particle size distribution in more detail, first, the reference transmitted light intensity Ia of transmitted light transmitted through the reference cell R is detected (S2). The reference transmitted light intensity Ia should be detected at least once, but it can also be, for example, the average value of multiple detections.

Next, the measured transmitted light intensity Ib of transmitted light transmitted through the measurement cell X is detected each time the rotating disk 12 makes one rotation (S3). The absorbance A(t) for the measurement cell X is then calculated based on the measured transmitted light intensity Ib and reference transmitted light intensity Ia (S4), and the first particle size distribution is calculated based on the time variation of this absorbance A(t) (S5).

After the first particle size distribution is calculated, the measurement method switching unit 43 determines whether to terminate the first measurement and switch to the second measurement (S6). Specifically, this measurement method switching unit 43 determines the switch from the first measurement to the second measurement based on the transmitted light intensity of light transmitted through the measurement cell X. Here, the measurement method switching unit 43 acquires the absorbance A(t) for the measurement cell X described above, and determines the switch from the first measurement to the second measurement when this absorbance A(t) is below a predetermined threshold. If it is determined to switch from the first measurement to the second measurement, the particle size distribution calculation unit 42 stops the first measurement (S7) and starts the second measurement (S8).

Specifically, when this second measurement is started, light from the second light source 22 is emitted to the measurement cell X, and the particle size distribution calculation unit 42 calculates the second particle size distribution.

To describe the calculation of the second particle size distribution in more detail, first, light from the second light source 22 is emitted to the reference cell R, and the background light intensity Id detected by the scattered light detector 32 is detected (S9). Next, the measured scattered light intensity Ie of light scattered by the particles in the measurement cell X is detected each time the rotating disk 12 makes one rotation (S10). The scattered light intensity B(t) from the measurement cell X is then calculated based on the measured scattered light intensity Ie and the background light intensity Id (S11), and the second particle size distribution is calculated based on the time variation of the scattered light intensity B(t) caused by the sedimentation of particles (S12).

With the particle size distribution measurement device 100 of the present embodiment configured in this way, the intensity of scattered light from centrifugally sedimenting particles can be detected by the scattered light detector 32, and the particle size distribution can be measured based on the time variation of the scattered light intensity caused by the centrifugal sedimentation of particles. Thus, it is possible to measure the particle size distribution for particles that do not have an absorption band for the light of the first light source 21 for detecting the transmitted light intensity mounted on the device, or for particles with a small particle size and low light absorption.

In particular, with the particle size distribution measurement device 100 of the present embodiment, it is possible to perform both particle size distribution measurement based on the time variation of scattered light intensity and particle size distribution measurement based on the time variation of transmitted light intensity. The particle size distribution measurement based on the time variation of transmitted light intensity is performed while particles with a large particle size and high absorbance are sedimenting, and then the particle size distribution measurement based on the time variation of scattered light intensity is performed while only particles with a small size and low absorbance are sedimenting, so that a wide range of particle size distributions can be accurately measured.

The present invention is not limited to the above-described embodiment.

For example, the particle size distribution measurement device 100 of the above embodiment performs both the particle size distribution measurement based on the time variation of transmitted light intensity and the particle size distribution measurement based on the time variation of scattered light intensity, but it is not limited to this. The particle size distribution measurement device 100 in another embodiment may only perform the particle size distribution measurement based on the time variation of scattered light intensity. In this case, the particle size distribution measurement device 100 need not include the first light source 21 and the transmitted light detector 31 described above.

The particle size distribution calculation unit 42 in another embodiment may be configured to constantly calculate both the absorbance A(t) and the scattered light intensity B(t) after the start of centrifugal sedimentation of particles, and store these in a memory unit provided in the controller 4. In this case, it may be configured that, after the particles in the measurement cell X have sedimented, a user refers to the absorbance A(t) and the scattered light intensity B(t) stored in the memory unit and calculates the particle size distribution using another computing device.

In another embodiment, the particle size distribution calculation unit 42 may determine whether to perform the first measurement or the second measurement according to the refractive index of the particles in a measurement sample. Specifically, the particle size distribution calculation unit 42 may determine whether to perform the first measurement or the second measurement depending on the difference between the refractive index of the particles in the measurement sample and the refractive index of a dispersion medium. For example, if the difference in refractive index between the particles and the dispersion medium is small, the second measurement should be performed because the emitted light is absorbed less. On the other hand, if the difference in refractive index between the particles and the dispersion medium is large, it is preferable to perform the particle size distribution measurement based on the time variation of transmitted light intensity.

In the particle size distribution calculated by using acquired scattered light intensity as it is, a peak position of the particle size distribution can be obtained with high accuracy, but it lacks quantitativeness and the peak height may not be obtained with high accuracy. Thus, the particle size distribution calculation unit 42 in another embodiment may correct the acquired scattered light intensity in the second measurement using Mie scattering theory and calculate the second particle size distribution based on the corrected scattered light intensity. With this configuration, the acquired scattered light intensity can be corrected using Mie scattering theory, which is a relational expression of a particle size and scattered light intensity, to calculate particle size distribution with improved quantitativeness, and a peak position and a peak height can be measured with high accuracy.

Figure 8:
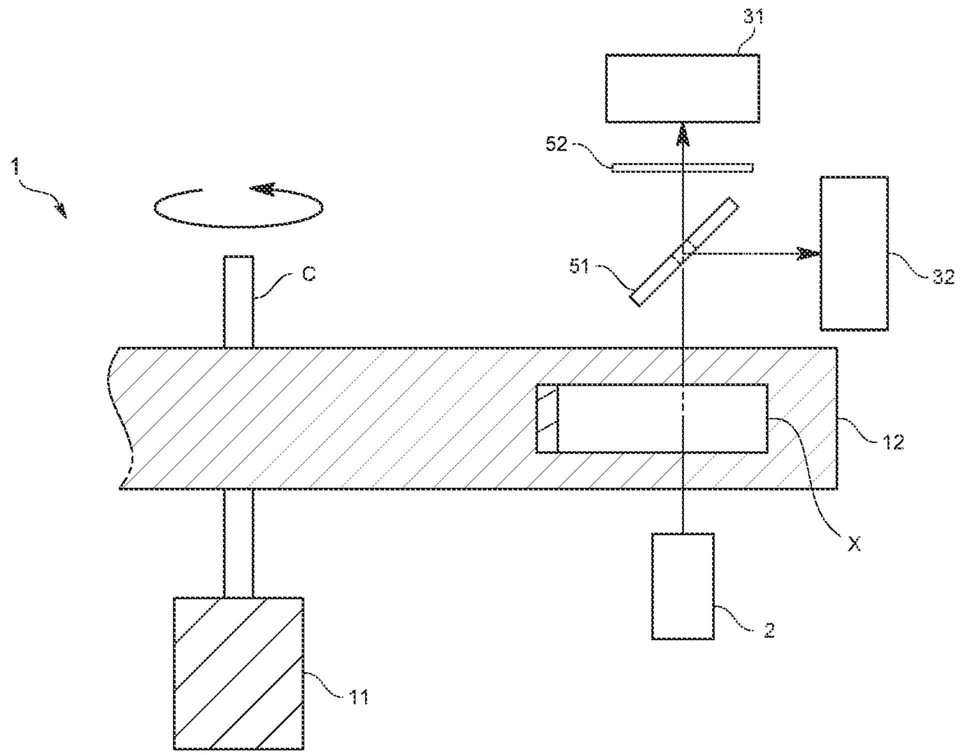
FIG. 8 is a diagram for explaining a light source, a transmitted light detector, and a scattered light detector in another embodiment.

The particle size distribution measurement device 100 of the above embodiment is configured such that the scattered light detector 32 and the transmitted light detector 31 detect light emitted from different light sources (i.e., the first light source 21 and the second light source 22), but it is not limited to this. The particle size distribution measurement device 100 of another embodiment may be configured, as illustrated in FIG. 8, such that the scattered light detector 32 and the transmitted light detector 31 detect light emitted to the measurement cell X from a common light source (e.g., semiconductor laser device). In this case, for example, as illustrated in FIG. 8, an optical element such as a mirror with a hole 51 may be placed between the transmitted light detector 31 and the rotating disk 12, guiding transmitted light from the measurement cell X through to the transmitted light detector 31 and reflecting scattered light from the measurement cell X to the scattered light detector 32. In this case, since the light intensity is too high if a laser beam is led directly to the transmitted light detector 31, a diffuser 52 or the like may be provided to diffuse the light between the transmitted light detector 31 and the optical element.

The particle size distribution calculation unit 42 in the above embodiment uses the background light intensity Id and the measured scattered light intensity Ie to calculate the time variation of the scattered light intensity B(t), but it is not limited to this. In another embodiment, the background light intensity Id may not be used, and only the measured scattered light intensity Ie may be used to calculate the time variation of the scattered light intensity B(t).

The particle size distribution measurement device 100 of the above embodiment is based on the homogeneous sedimentation method, but is not limited to this method. The particle size distribution measurement device 100 of another embodiment may use a line start method in which a sample suspension is fed into a measurement cell X containing a density gradient solution made of sucrose solution or the like, and particles in the sample suspension are centrifuged and sedimented in the density gradient solution.

In the above embodiment, the measurement method switching unit 43 determines the switch from the first measurement to the second measurement when the acquired absorbance A(t) falls below a predetermined threshold, but it is not limited to this. In another embodiment, the measurement method switching unit 43 may be configured to switch from the first measurement to the second measurement after predetermined time has elapsed since the start of measurement.

Figure 9:
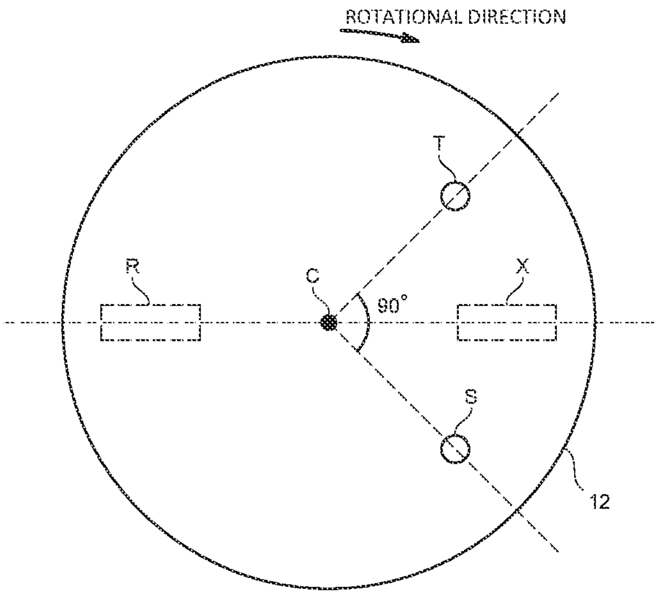
FIG. 9 is a plan view schematically illustrating an arrangement pattern of each cell and each optical system in another embodiment.

The particle size distribution measurement device 100 of another embodiment may have the transmission optical system T and the scattering optical system S positioned 90° (270°) apart from each other along the rotational direction, as viewed from the direction along the rotation axis C, as illustrated in FIG. 9. Not limited to this, the transmission optical system T and the scattering optical system S may be positioned at any angular misalignment along the rotational direction except 0° (360°).

Figure 10:
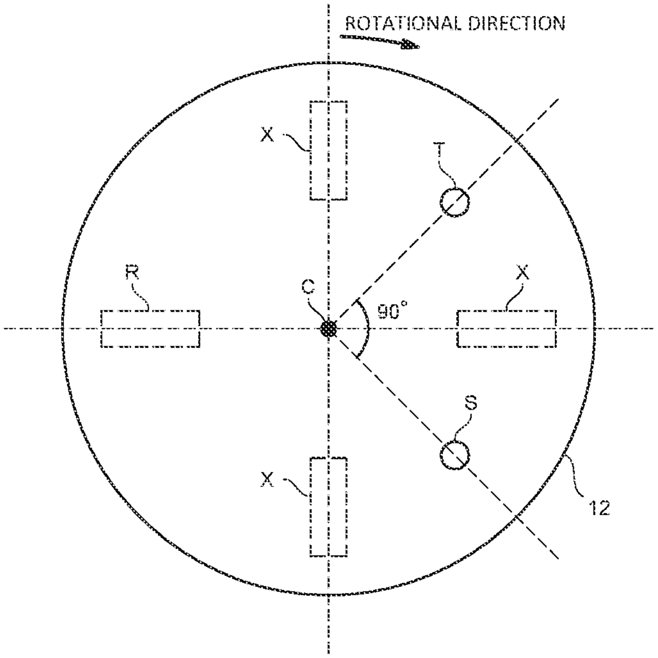
FIG. 10 is a plan view schematically illustrating an arrangement pattern of each cell and each optical system in another embodiment.
Figure 11:
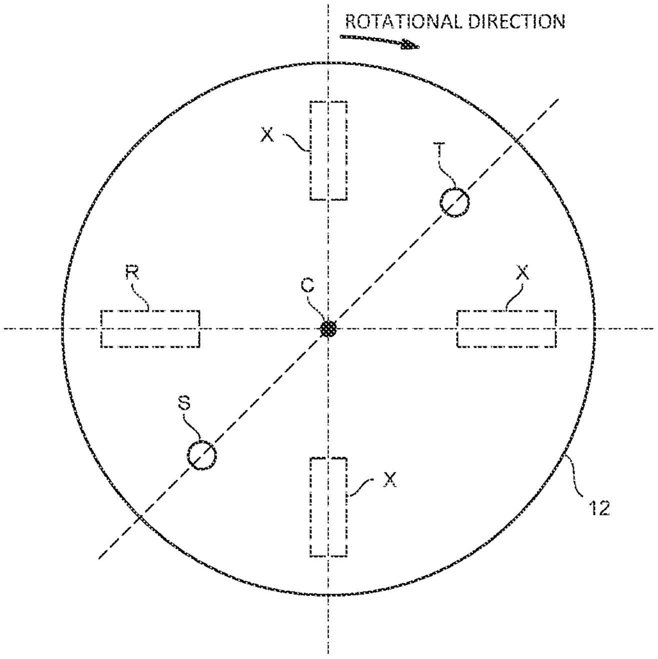
FIG. 11 is a plan view schematically illustrating an arrangement pattern of each cell and each optical system in another embodiment.

In another embodiment of the particle size distribution measurement device 100, the rotating disk 12 may be configured to hold a plurality of measurement cells X at positions displaced along the rotational direction thereof. For example, as illustrated in FIG. 10, the rotating disk 12 may be configured to hold three measurement cells X and a reference cell R at positions 90° apart from each other along its rotational direction. With this configuration, several different types of samples can be measured at once. In this case, the transmission optical system T and the scattering optical system S may be positioned 90° apart from each other along the rotational direction, 180° apart from each other as illustrated in FIG. 11, or any other angle except 0° (360°).

Needless to say, the present invention is not limited to the aforementioned embodiments, and various other variations are possible without departing from the intent of the invention.

INDUSTRIAL APPLICABILITY

According to the present invention described above, a centrifugal sedimentation type particle size distribution measurement device that can perform particle size distribution measurement for particles with low absorbance can be provided.

The invention claimed is:

1. A centrifugal sedimentation type particle size distribution measurement device that measures particle size distribution in a measurement sample by rotating a measurement cell containing the measurement sample and sedimenting particles in the measurement sample, the device comprising:

a light source that emits light to the measurement cell;

a scattered light detector that detects scattered light intensity of light scattered by the particles in the measurement cell; and a particle size distribution calculation unit that measures particle size distribution in the measurement sample based on sedimentation velocities of the particles along a direction of centrifugal force, the sedimentation velocities being obtained from a scattered light intensity curve representing a time variation of scattered light intensities from particles caused by sedimentation of the particles, where the particles have different sedimentation times corresponding to differences in particle size.

2. The particle size distribution measurement device according to claim 1, wherein the scattered light detector includes at least one of a forward light detector that detects forward scattered light and a backward light detector that detects backward scattered light from the particles.

3. The particle size distribution measurement device according to claim 1, further comprising a transmitted light detector that detects transmitted light intensity of light transmitted through the measurement cell, wherein the particle size distribution calculation unit further measures the particle size distribution in the measurement sample based on time variation of the transmitted light intensity.

4. The particle size distribution measurement device according to claim 3, wherein the particle size distribution calculation unit measures particle size distribution of a particle size larger than a predetermined threshold based on the time variation of the transmitted light intensity, and measures particle size distribution of a particle size equal to or smaller than the predetermined threshold based on the time variation of the scattered light intensity.

5. The particle size distribution measurement device according to claim 4, wherein the particle size distribution calculation unit measures the particle size distribution in the measurement sample based on the time variation of the transmitted light intensity and then measures the particle size distribution in the measurement sample based on the time variation of the scattered light intensity.

6. The particle size distribution measurement device according to claim 3, wherein the light source includes a semiconductor laser device and an LED device, the scattered light detector is configured to detect the scattered light of laser light emitted from the semiconductor laser device and scattered by the particles, and the transmitted light detector is configured to detect the transmitted light emitted from the LED device and transmitted through the measurement cell.

7. The particle size distribution measurement device according to claim 3, wherein the scattered light detector and the transmitted light detector are configured to detect light emitted to the measurement cell from a common light source.

8. The particle size distribution measurement device according to claim 1, wherein the light source emits light to a fixed measurement surface of the measurement cell, the scattered light detector measures scattered light when the light from the light source is scattered by the particles in the measurement cell, and the particle size distribution calculation unit measures particle size distribution base on the scattered light from the light emitted to the fixed measurement surface.

9. A particle size distribution measurement method, using a centrifugal sedimentation method, that measures particle size distribution in a measurement sample by rotating a measurement cell containing the measurement sample and sedimenting particles in the measurement sample, the method comprising:

a step of emitting light to the particles;

a scattered light detecting step of detecting scattered light intensity of light scattered by the particles; and a particle size distribution calculation step of measuring particle size distribution in the measurement sample based on sedimentation velocities of the particles along a direction of centrifugal force, the sedimentation velocities being obtained from a scattered light intensity curve representing a time variation of scattered light intensities from particles caused by sedimentation of the particles, where the particles have different sedimentation times corresponding to differences in particle size.

10. A non-transitory computer readable medium storing a program for a centrifugal sedimentation type particle size distribution measurement device that measures particle size distribution in a measurement sample by rotating a measurement cell containing the measurement sample and sedimenting particles in the measurement sample, the device including:

a light source that emits light to the measurement cell;

a scattered light detector that detects scattered light intensity of light scattered by irradiation of light to the particles, the program causing a computer to perform a function as a particle size distribution calculation unit that measures particle size distribution in the measurement sample based on sedimentation velocities of the particles along a direction of centrifugal force, the sedimentation velocities being obtained from a scattered light intensity curve representing a time variation of scattered light intensities from particles caused by sedimentation of the particles, where the particles have different sedimentation times corresponding to differences in particle size.

* * * * *